United States Patent [11] 3,591,167

| [72] | Inventor | Stanley R. Norbutas |
| | | Glenview, Ill. |
| [21] | Appl. No. | 802,928 |
| [22] | Filed | Feb. 27, 1969 |
| [45] | Patented | July 6, 1971 |
| [73] | Assignee | Signode Corporation |

[54] SHEET FEEDING APPARATUS
27 Claims, 14 Drawing Figs.

[52] U.S. Cl. ................................................. 271/9,
271/11, 271/35
[51] Int. Cl. ..................................................... B65h 5/02,
B65h 5/08
[50] Field of Search ........................................ 271/35, 19,
20, 42, 26.9, 10, 11, 43

[56] References Cited
UNITED STATES PATENTS

| 571,601 | 11/1896 | McKee | 271/20 |
| 1,127,991 | 2/1915 | Harbaugh | 274/43 UX |
| 1,460,336 | 6/1923 | Hart | 271/20 |
| 2,573,944 | 11/1951 | Anderson | 271/35 |
| 2,827,288 | 3/1958 | Geisler | 271/42 X |
| 3,063,578 | 11/1962 | Millar | 271/43 X |
| 3,126,200 | 3/1964 | Rehm | 271/26 |
| 3,198,515 | 8/1965 | Pitney | 271/26 |

*Primary Examiner*—Joseph Wegbreit
*Attorney*—Dressler, Goldsmith, Clement & Gordon

ABSTRACT: Apparatus usable in connection with brick stacking and strapping apparatus for placing course-separating sheets, such as paper, upon a course of bricks, and for placing course-supporting sheets, such as veneer upon a course of bricks. The feeder includes a hopper means for storing a stack of separating sheets and a stack of supporting sheets, with a first mechanism being provided for shifting a separating sheet from the hopper means toward a course of bricks, and with a second mechanism being provided for shifting a supporting sheet toward a course of bricks. A single transfer means is provided for moving the shifted sheets from the hopper means to a brick stacking station, and the hopper means is mounted for movement adjacent the transfer means to position sheet outlet openings in the hopper means in discharging relationship with respect to the transfer means.

Inventor:
Stanley R. Norbutas
By Dressler, Goldsmith, Clement & Gordon
Attys

SHEET FEEDING APPARATUS

The supporting sheet-discharging mechanism operates to dispense the lowermost sheet in the stack of sheets, and includes a dog that is carried on an endless chain, with the dog being arranged to move in a rectilinear path adjacent the lower end of the veneer storage compartment.

The separating sheet-discharging mechanism functions in a novel manner to lift the uppermost sheet from the stack of sheets by initially creating a bulge in the uppermost sheet, moving a suction assembly into engagement with the bulged portion of the sheet, and lifting the sheet above a support. The sheet is then transferred outwardly of the hopper by a pusher mechanism, and the pusher mechanism includes a plurality of paper-engaging members that are mounted on a support structure with one-way clutch means that allows the members to rotate freely as the pusher means moves in one direction, but which prevent the members from rotating when the pusher means moves in an opposite direction, so that the paper is fed outwardly of the hopper means. Spring means bears upon the pusher means when it is in a rest position to shift the pusher means slightly outwardly to create the bulge in the next uppermost sheet.

BACKGROUND OF THE INVENTION

Since the advent of apparatus for automatically strapping bricks, it has been conventional to provide brick-stacking apparatus for automatically arranging a plurality of courses of bricks into a pack or bundle. Such bundles conventionally have an open course at the lower end thereof to accommodate the forks on a lift truck for transportation of the bundle.

In order to prevent the strapped brick bundle from bursting when the straps under tension are severed, it has been conventional to place a separating sheet of paper or the like between one or more of the brick courses. The separating sheets also serve to prevent the bricks from abrading upon themselves during shipment. Also, in order to support the bricks above the open course, it has been conventional to place a fairly rigid supporting sheet of veneer, or the like, above the open course of bricks.

In many prior art arrangements, the separating and supporting sheets are manually placed upon the brick courses, and this is obviously a time-consuming and expensive operation. Many different arrangements have been proposed for automatically feeding the supporting and separating sheets, but heretofore, none has proved entirely satisfactory.

One of the major problems present in feeding supporting sheets is the fact that inexpensive material is used, such as veneer or wood scrap material, and oftentimes, the separating sheets are extremely warped, which prevents the sheets from being nested in a neat stack. Perhaps the greatest difficulty in feeding the paper-separating sheets is that the sheets have a tendency to adhere to one another, thus making it difficult to consistently dispense only a single sheet.

SUMMARY OF THE INVENTION

The structure of the present invention provides a novel means for automatically feeding course-separating sheets and course-supporting sheets to a brick-stacking station in automatic brick stacking and strapping apparatus. The structure of the present invention includes a single hopper means having a first compartment for storing a stack of separating sheets and a second compartment for storing a stack of supporting sheets. Sheet transfer means is provided at a fixed location on the frame of the apparatus and the hopper means is mounted for movement relative to the frame to either position a discharge opening in the separating sheet compartment in alignment with the sheet transfer means or position a discharge opening in the supporting sheet compartment in alignment with the sheet transfer means.

A bottom discharge mechanism cooperates with the supporting sheet compartment means to discharge the lowermost sheet therein and place the same in sheet-feeding relationship with respect to the transfer means. The discharge mechanism includes a conveyor means having an endless chain centrally disposed beneath the stacks of sheets, with a reach portion disposed in parallelism with the bottom of the supporting sheet compartment means, and with the chain having dog structure thereon that is movable into engagement with the end of the lowermost supporting sheet for shifting the sheet outwardly of the discharge opening into engagement with the transfer means. A sheet deflector means is provided at the brick-strapping station for deflecting the sheet downwardly onto the open course of bricks.

The apparatus also includes supporting sheet guiding and positioning means for insuring that a discharged supporting sheet will be positioned in proper relationship upon an open brick course. The frame of the hopper means includes stack retention means above the discharge opening for holding the stack of sheets above the lowermost sheet against movement during shifting of the lowermost sheet into engagement with the sheet transfer means. The entire stack of supporting sheets rests upon a pair of closely spaced, centrally disposed rails that support the stack adjacent the centerline thereof, so that even if the sheets are severely warped, the dog structure on the endless chain will contact the lowermost sheet to shift the same from the compartment means.

A top discharge mechanism is provided for displacing the uppermost separating sheet from its compartment means and for placing the sheet in feeding engagement with the sheet transfer means. This latter discharge mechanism includes a novel pusher means that is movable transversely of the compartment means, with sheet-engaging members on the pusher means being connected by one-way clutch means to a support structure, so that as the pusher means moves towards the discharge opening in the compartment means, the sheet-engaging members are held against rotation so as to shift the uppermost sheet into engagement with the sheet transfer means, while during return movement of the pusher means, the sheet-engaging members are free to rotate so that no movement is imparted to the next uppermost sheet in the stack.

A spring member biases the pusher member away from its home or rest position, with the one-way clutch means cooperating with the sheet-engaging members to hold them against rotation thereby allowing a bulge or bubble to be created in the uppermost sheet. A sheet-lifting assembly is mounted for movement relative to the compartment means, and includes a suction cup member that is movable into sheet-capturing relationship with respect to the bulged portion of the uppermost sheet. After the sheet has been captured, the sheet-lifting assembly is moved upwardly to position the sheet above a support, whereupon the sheet is released and positioned in alignment with the discharge opening in the compartment means. As is mentioned above, the sheet is shifted outwardly of the discharge opening by forward movement of the pusher means, and after the sheet is engaged by the sheet transfer means, a fluidic air guide means cooperates to support and guide the sheet into the proper position over the brick course. The sheet is then removed from the influence of the fluidic guide means and is deflected downwardly onto the course of bricks by a deflector mechanism.

BRIEF DESCRIPTION OF THE DRAWINGS

FIG. 8 is an enlarged sectional view taken generally along line 8—8 of FIG. 7;

DESCRIPTION OF THE PREFERRED EMBODIMENT

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Figure 1:
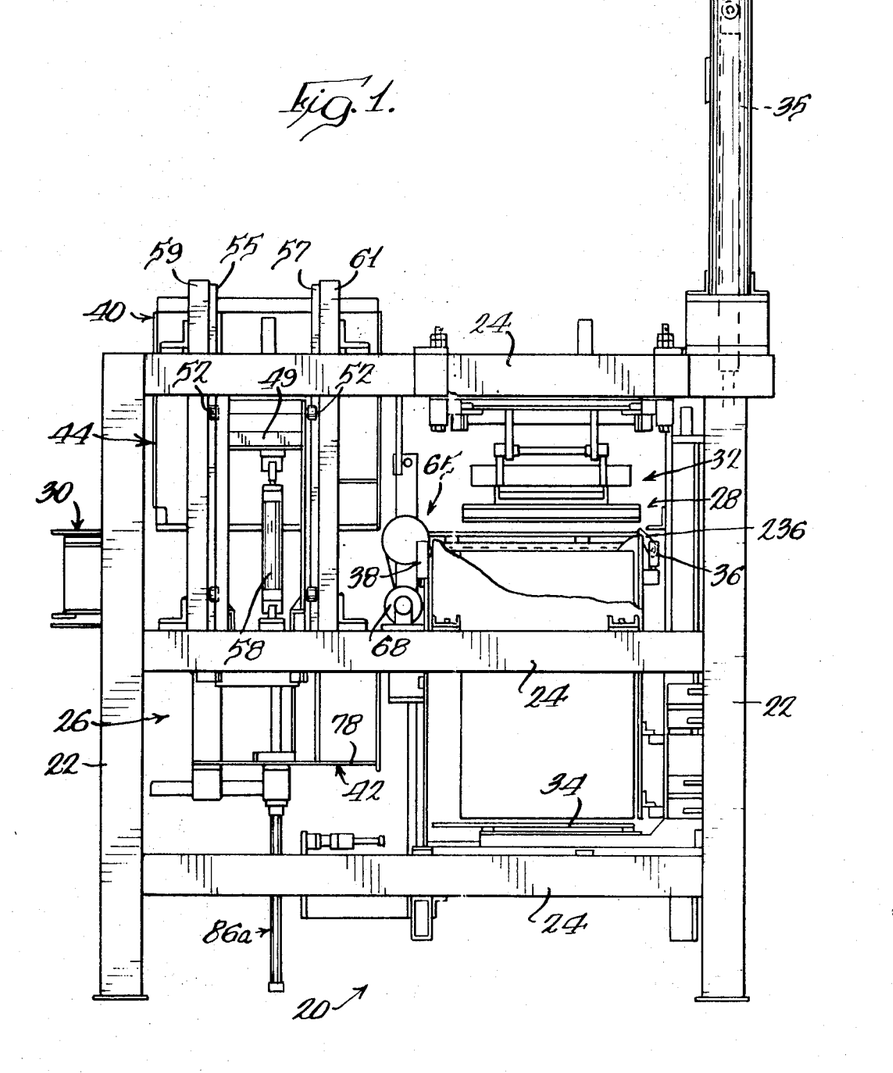
FIG. 1 is a side elevational view of a brick-stacking apparatus that includes the sheet-feeding structure of the present invention, with certain parts broken away for clarity of illustration.

Referring to the drawings in detail, the brick-handling apparatus is illustrated generally at 20, and the apparatus includes a frame having a plurality of upright supports 22 joined to a plurality of horizontal supports 24. A sheet storing and feeding means 26 is positioned alongside a brick-stacking station 28, as can be best seen at FIG. 2, and a brick bundle strapping station (not shown) is provided to the right of stacking station 28. A conveyor 30 is provided at one side of the apparatus (FIG. 2) for transporting bricks in the direction indicated by the arrows, into a position in front of a clamping and carrying assembly 32. When a predetermined number of bricks is accumulated in front of the carrier assembly, the carrier is moved forwardly by structure which forms no part of the present invention to position the bricks above a vertically movable elevator 34 at the brick-stacking station. The elevator is moved upwardly by a power cylinder 35 in timed relation to the arrival of the carrier assembly at the brick-stacking station, and the clamping means associated with the carrier assembly are released to transfer the bricks to the elevator 34. A photoelectric assembly 36, 38 (FIG. 1) scans the level of bricks accumulated upon the elevator for giving a signal when the level of bricks on the elevator 34 drops below the level of the photoelectric unit. Limit switches 37 and 39 (FIG. 2) are mounted on the apparatus frame adjacent the stacking station, and are actuated by respective actuating members 41 and 43 associated with the carrier assembly for giving a signal when the carrier assembly leaves a position disposed over the elevator and when the carrier assembly reaches a home or rest position.

Figure 6:
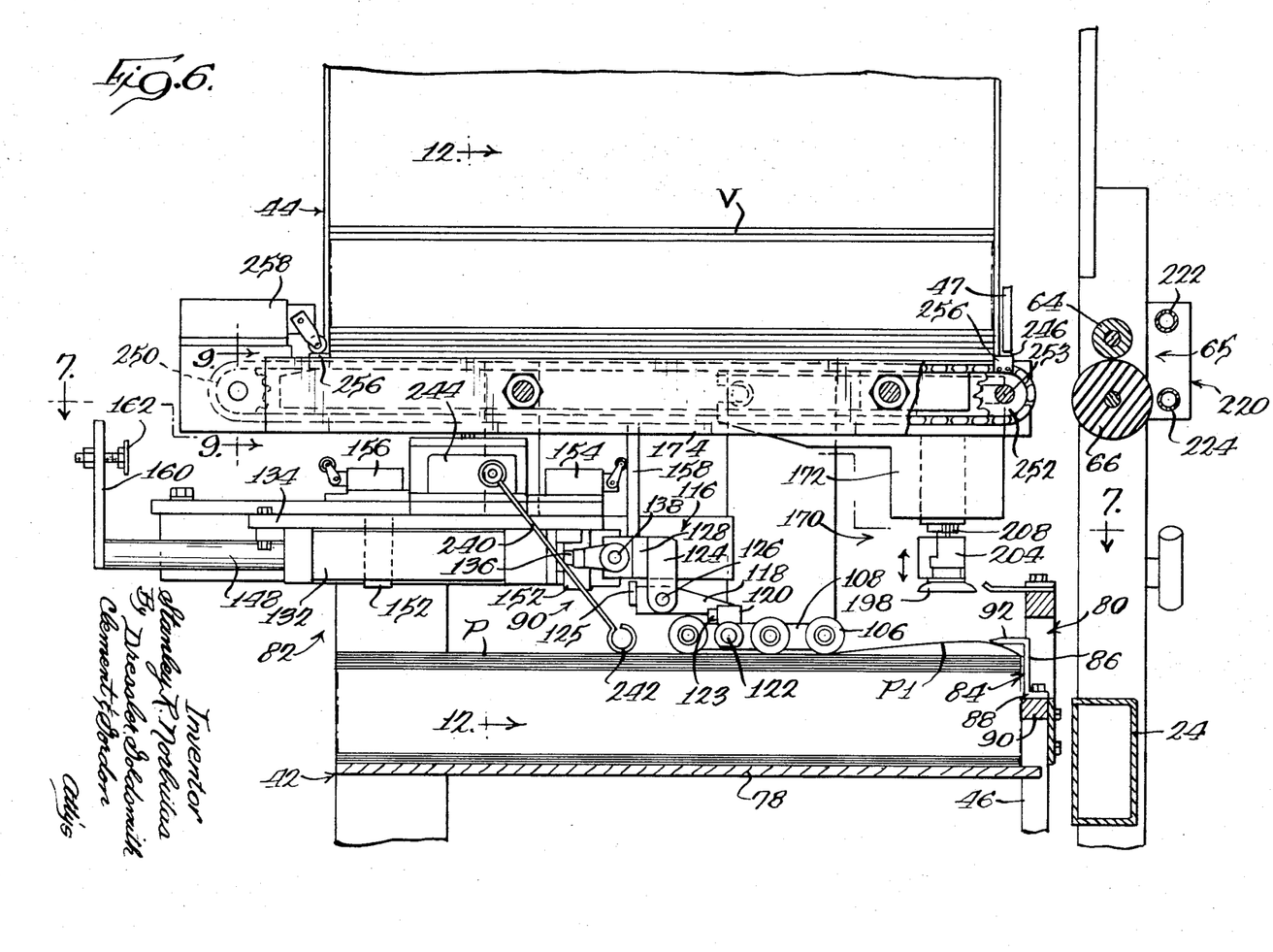
FIG. 6 is an enlarged sectional view taken generally along line 6—6 of FIG. 4.

The sheet storing and feeding apparatus 26 includes a hopper means 40 having a first compartment means 42 at the lower end thereof, and a second compartment means 44 at the upper end thereof. Compartment means 42 is adapted to store therewithin a stack of course-separating sheets, such as paper P (FIG. 6); while compartment means 44 is adapted to store therewithin a stack of course-supporting sheets, such as veneer V (FIG. 6).

Figure 2:
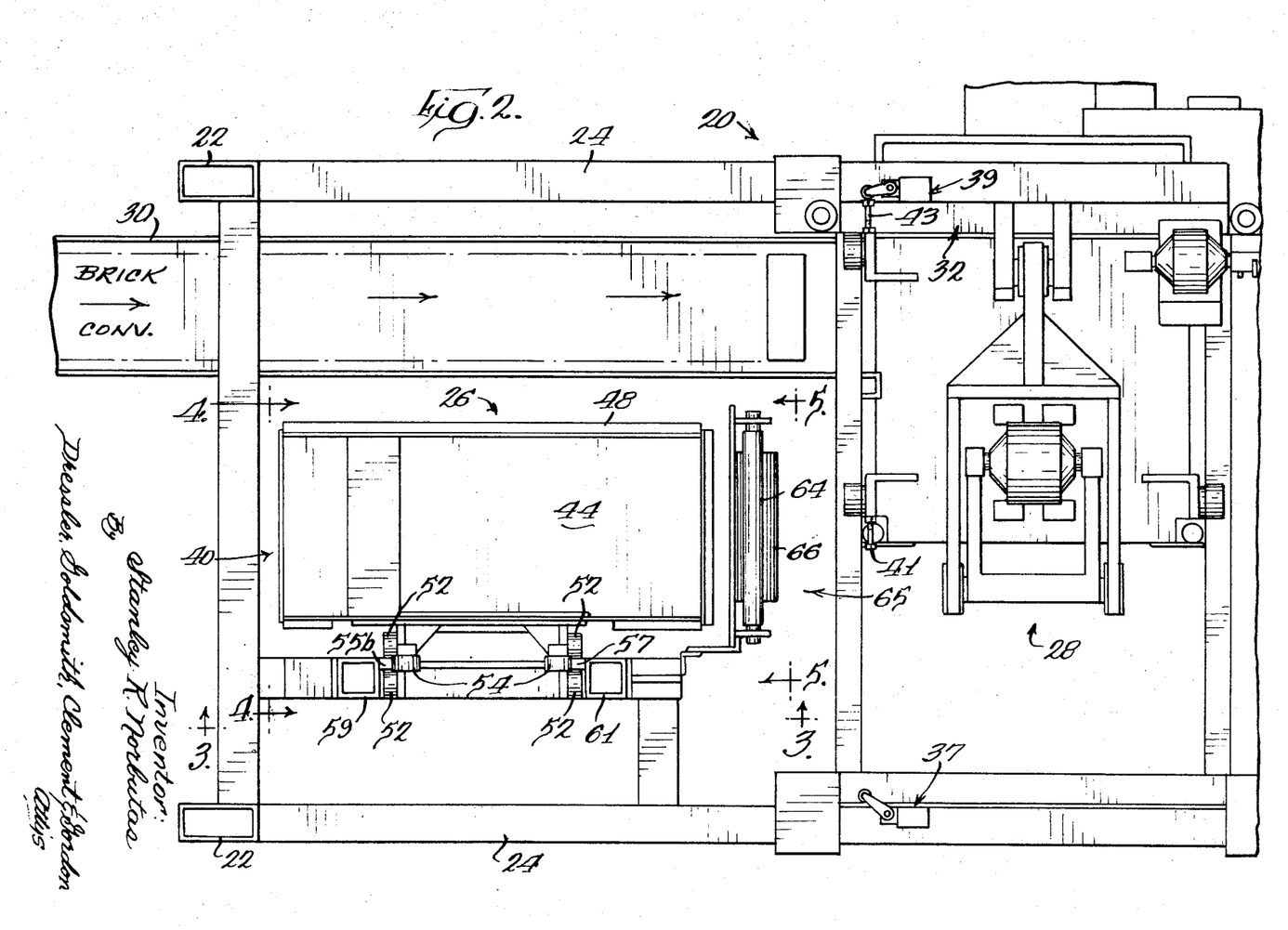
FIG. 2 is a top plan view of the structure illustrated in FIG. 1.
Figure 3:
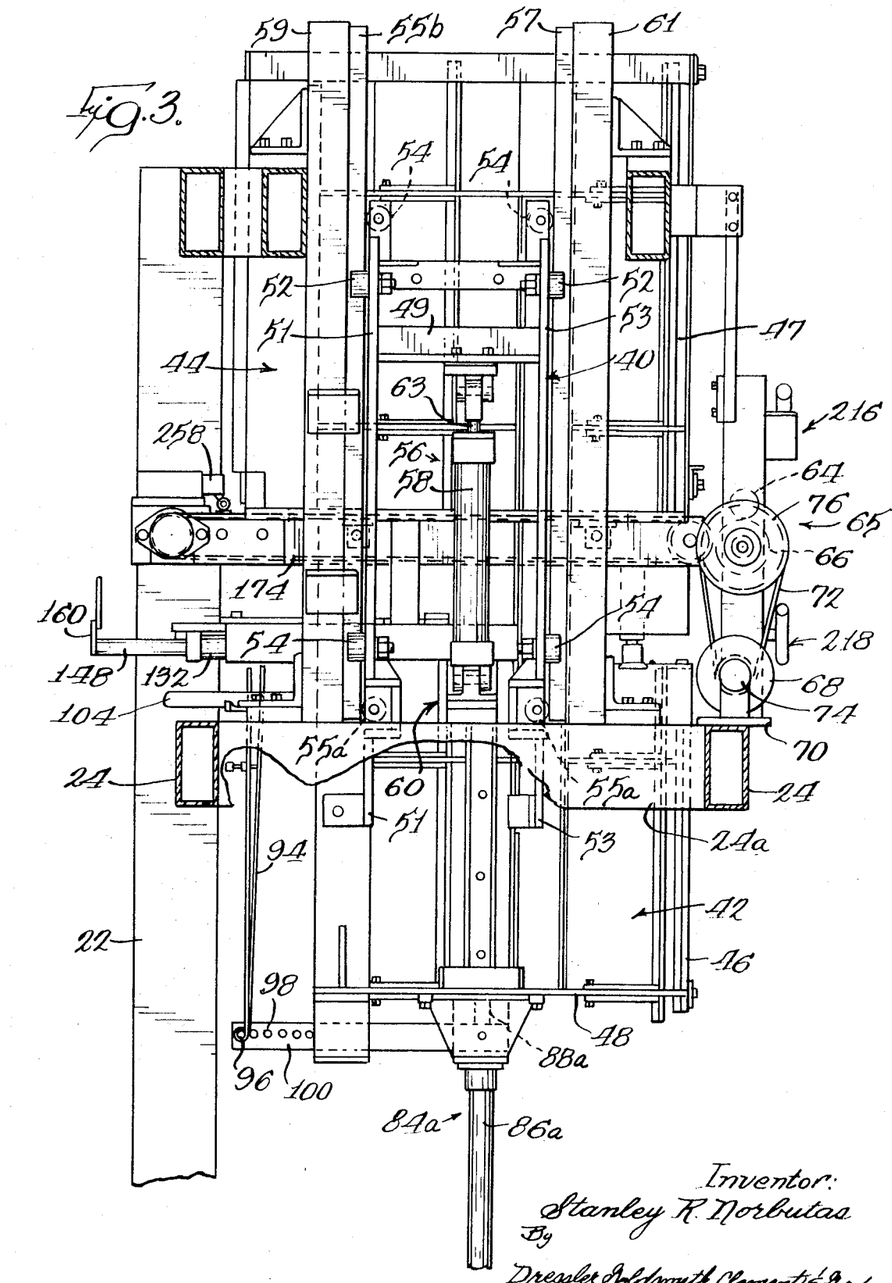
FIG. 3 is a sectional view taken generally along line 3—3 of FIG. 2.

The compartment means 42 and 44 are of open frame construction and are generally rectangular in plan view, as is evident from FIG. 2, where compartment means 44 is illustrated. Compartment means 42 and 44 include upright guide members 46 and 47, respectively, and members 46 and 47 are retained in spaced relationship with respect to one another by respective horizontal support members 48 and 49. Compartment means 42 and 44 are connected to one another by vertically extending frame members 51 and 53, and the hopper means 40 is mounted for vertical movement adjacent the stacking station 28 by a plurality of rollers that bear upon vertical guide portions of members 51 and 53. As can be seen in FIGS. 2 and 3, mutually perpendicular rollers 52 and 54 are provided adjacent the upper end of members 51 and 53, while mutually perpendicular lower rollers 54 and 55a are provided adjacent the lower end of members 51 and 53. Rollers 51, 52, 54 and 55a bear upon vertical guide surfaces on bearing plates 55b and 57 that are secured to upright frame members 59 and 61, so that the hopper means 40 is positively confined for vertical movement relative to the frame of the apparatus. The hopper 40 is located in a lower or veneer-feeding position by rod 63 bottoming in cylinder 58.

Hopper-lifting means 56 is connected between frame member 24a and the hopper means for elevating the hopper to paper-feeding position. Lifting means 56 includes a power cylinder 58 having its lower end connected by trunnion structure 60 to frame member 24a and having its rod end connected to a horizontally disposed member 49a adjacent the upper end of the hopper means. As will be hereinafter described, the hopper means 40 is positioned in separating sheet-feeding relationship when the rod 63 of the cylinder 58 reaches the end of its stroke.

Sheet transfer means 65 is positioned at a fixed location on the frame 20, and the sheet transfer means includes a pair of horizontally disposed rollers 64 and 66 positioned in sheet-feeding engagement with one another. A drive motor 68 (FIG. 3) is supported upon a bracket 70 that is secured to frame member 24, and roller 66 is rotated by an endless belt 72 that is trained over a sheave 74 on the output shaft of the motor and over a sheave 76 at one end of the roller 66.

The separating sheet compartment 42 includes a paper-supporting member 78 adapted to have the stack of separating sheets rest thereon. A discharge opening 80 (FIG. 6) is provided in the compartment means 42 adjacent the upper end thereof and facing the brick-stacking station 28. A sheet-shifting means 82 is provided adjacent the upper end of the compartment means 42 for shifting sheets outwardly of discharge opening 80 into feeding relationship with rollers 64 and 66. A stack-elevating means 84a is provided for shifting the stack of separating sheets upwardly within compartment 42 as the sheets therein are depleted, so that the uppermost sheet will always be disposed in proper relationship to be acted upon by the sheet-feeding means 82. The elevator means 84a includes a power cylinder 86a having its rod end 88 connected by suitable support structure to the stack-supporting member 78. Sensing means 90a (FIG. 6), to be hereafter described, is operatively responsive to the upper level of sheets within compartment 42 for energizing power cylinder 86a when a predetermined number of sheets has been dispensed from the compartment by the cooperative action of the shifting means 82 and transfer means 65.

Stop means 84 are provided adjacent the discharge side of compartment means 42 and the stop means 84 is provided by the vertical portion 86 of a bracket 88 that is secured to a horizontally disposed support member 90. Bracket 88 includes a horizontally disposed upper portion 92 that extends inwardly of the compartment means 42, and which defines a support upon which the uppermost separating sheet rests prior to its being shifted outwardly of discharge opening 80.

Figure 4:
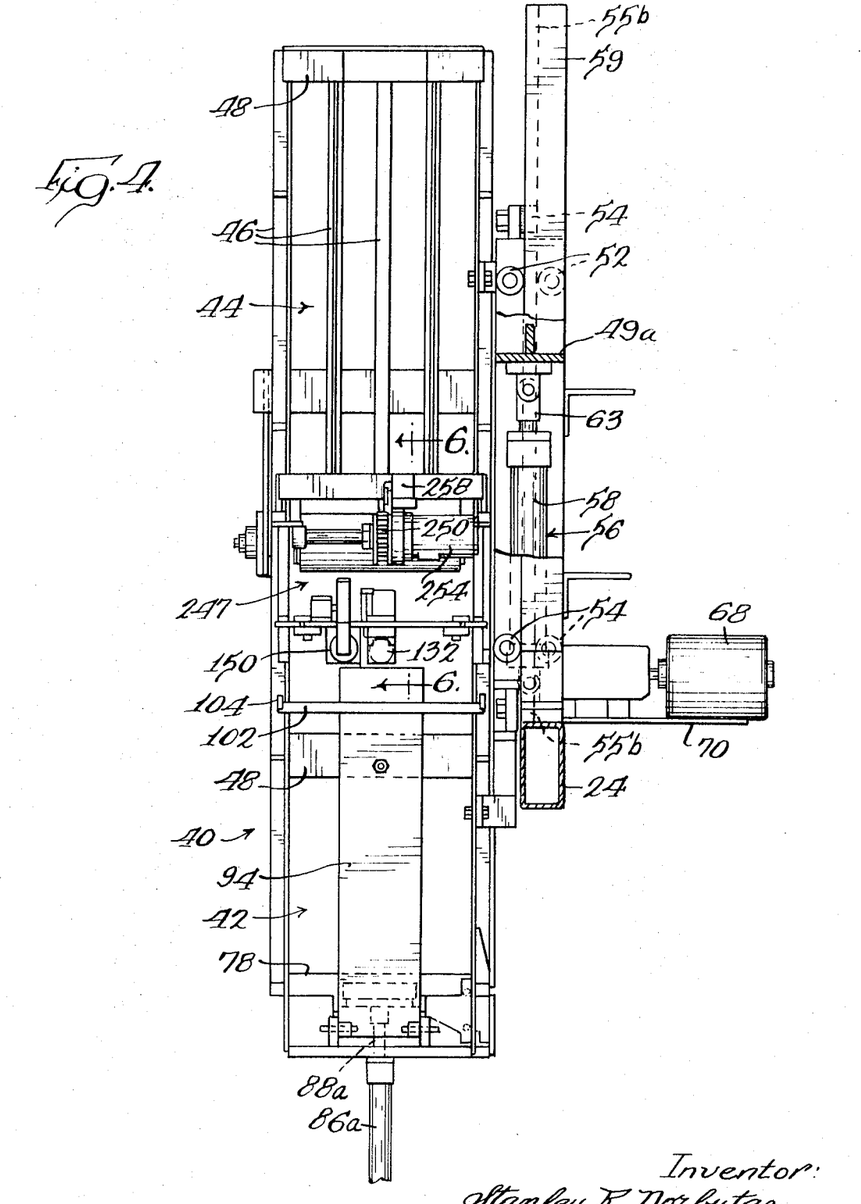
FIG. 4 is a sectional view taken generally along line 4—4 of FIG. 2.

The stack of separating sheets within compartment 42 is urged toward the guides 46 and bracket 88 by a pressure plate 94 best seen in FIGS. 3 and 4. A pressure plate 94 may be adjusted inwardly toward the forward side of the compartment 42 to allow for use of paper of different size, and to this end, plate 94 includes a pin 96 at the lower end thereof, that may be mounted in any one of a plurality of horizontally spaced openings 98 in a support member 100. A horizontally disposed crossbar 102 engages plate 94 adjacent the upper end thereof, and crossbar 102 is retained in the selected position of adjustment by pivotally mounted latch handles 104. In this manner, it will be appreciated that the pressure plate 94 can be shifted within the compartment means 42 to accommodate different sized paper.

Figure 7:
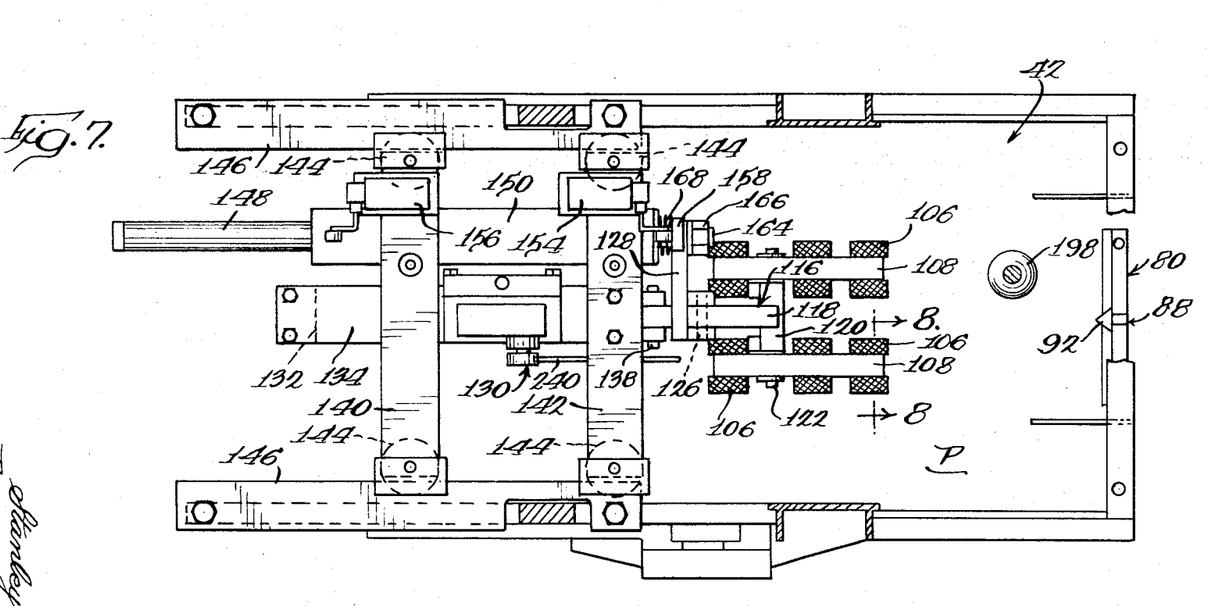
FIG. 7 is a sectional view taken generally along line 7—7 of FIG. 6.

The paper-shifting means 82 will be best understood from a consideration of FIGS. 6—8. With particular reference to FIG. 7, it will be noted that a plurality of wheellike paper-engaging members 106 are positioned in engagement with the uppermost separating sheet in the stack, and members 106 have serrated outer surfaces to enhance their frictional engagement with the paper. Paper-engaging members 106 are connected to a support member 108 by a one-way clutch structure 110 (FIG. 8) that holds the members 106 against rotation when they are moved toward the discharge opening 80, but which allows the members 106 to rotate freely when they are moved away from the discharge opening. The one-way clutches 110 are conventional commercially available structures, such as the roller clutch available from the Torrington Company under catalog No. 101410. As is evident from FIG. 7, two sets of paper-engaging members are provided in the illustrated embodiment with the supports 108 for the members being positioned equally outwardly from the centerline of compartment means 42. Three pairs of paper-engaging members 106 are connected to each support member 108, and the paper-engaging members of each pair are secured to a transversely extending shaft 112 by screws 114.

The support members 108 are pivotally connected to a support structure 116 by a dual pivot means that provides a knee action arrangement to insure that all of the members 106 engage the uppermost sheet of paper regardless of whether or not several sheets of paper have been removed from the stack. The support structure 116 includes a pusher link 118 secured adjacent the forward end thereof, to a transverse block 120, with block 120 having laterally outwardly extending pins 122 that pivotally mount the support members 108. The midportion of pusher link 118 is pivotally connected at 126 to a generally vertically disposed guide bar 124, and guide bar 124 includes a transversely extending portion 128 that is connected to a pusher means 130. Pivots 122 and 126 cooperate to provide a floating type of mounting for the paper-engaging members 106 to insure their engagement with the uppermost sheet in compartment means 42. A rearwardly extending stop 123 on block 120 is positioned to engage the upper surface of one of the supports 108, and an upwardly extending stop 125 on link 118 is positioned to engage the undersurface of guide bar portion 128 to limit the pivotal movement of the supports 108, so that the members 106 will always assume a favorable paper-feeding relationship.

The pusher means 130 includes a centrally disposed power cylinder 132 that is connected to the lower side of a mounting plate 134, and the rod end 136 of cylinder 132 is connected to link 118 by a transversely extending pin 138. Mounting plate 134 is secured to a pair of spaced parallel support members 140 and 142 that extend transversely across compartment means 42, and members 140 and 142 may be secured at desired positions of adjustment relative to compartment means 42 by clamp washers 144 that clampingly engage spaced parallel frame members 146. The pusher assembly 130 is guided in its reciprocating movement toward and away from discharge opening 80 by a guide shaft 148 that is spaced from and parallel with the axis of cylinder 132, as can be best seen in FIG. 7. Shaft 148 is confined for axial sliding movement by a guide tube 150 that is secured to support members 140 and 142 by sleeves 152 (FIG. 6).

A first limit switch 154 is mounted upon support member 142, and is adapted to be actuated when the pusher assembly 130 is in a home or rest position spaced from the discharge opening 80. A second limit switch 156 is mounted upon member 140, and is adapted to be actuated when the pusher assembly is in the fully extended position adjacent discharge opening 80. A switch actuator 158 extends upwardly from the transversely extending portion 128 of guide bar 124 for actuating switch 154, and a switch actuator 162 is provided on an upwardly extending member 160 at the rearward end of shaft 148 for actuating switch 156.

A screw 164 is connected by a nut 166 to guide bar portion 128 in alignment with shaft 148 and a spring 168 is interposed between the head of screw 164 and the end of guide sleeve 150 for biasing the pusher assembly 130 away from the rest or home position after the cylinder rod 136 has been retracted. Because of the action of the one-way clutches on the paper-engaging members 106, when the spring 168 pushes the pusher assembly 130 outwardly toward the discharge opening 80, the uppermost sheet in the stack of separating sheets will be pushed forwardly into engagement with the stop 86, and a bulge or bubble P' (FIG. 6) will be created in the uppermost sheet.

Figures 9, 10, 11:
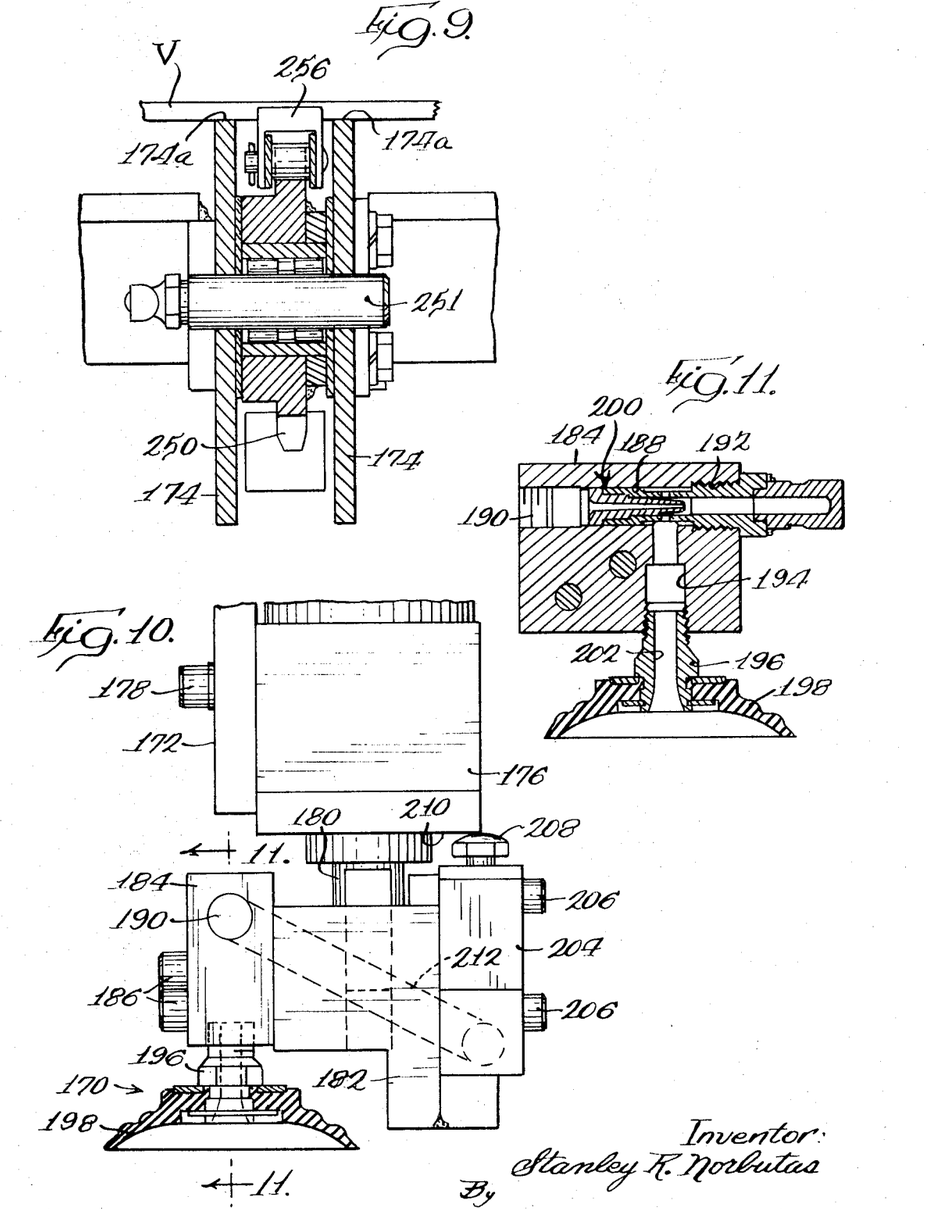
FIG. 9 is an enlarged sectional view taken generally along line 9—9 of FIG. 6.
FIG. 10 is an enlarged side elevational view, partly in section, of a portion of the separating sheet-lifting means.
FIG. 11 is a sectional view taken generally along line 11—11 of FIG. 10.
Figure 12:
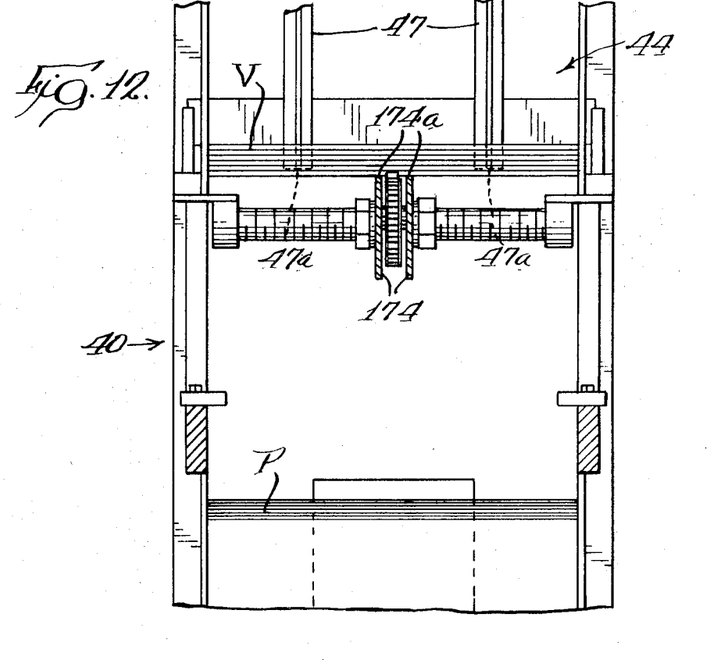
FIG. 12 is a sectional view taken generally along line 12—12 of FIG. 6.
Figure 13:
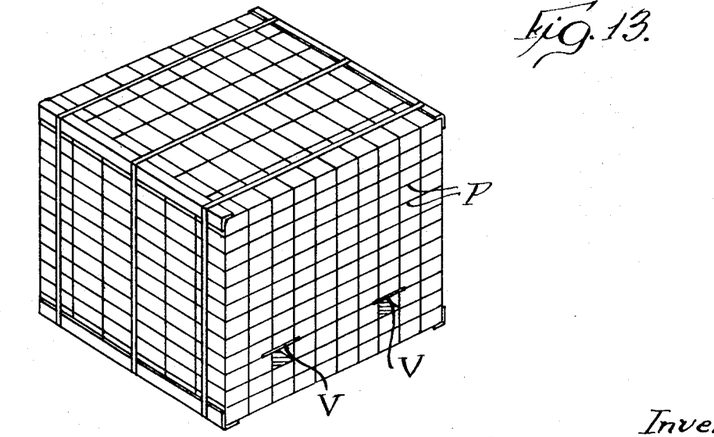
FIG. 13 is a top perspective view of a pack of strapped bricks having supporting sheet and separating sheets therein.

A sheet-lifting means 170 (FIGS. 6, 10 and 11) is movable downwardly into engagement with the bulged sheet portion P' for capturing the sheet, lifting it above the support portion 92 of bracket 88, and releasing the sheet for movement outwardly of the discharge opening 80. The paper-lifting assembly 170 is carried upon a mounting plate 172 that is secured to one of a pair of spaced plates 174 at the bottom of the supporting sheet compartment means 44. The lifting means 170 includes a pneumatic power cylinder 176 secured to plate 172 by fasteners 178, and cylinder 176 includes a downwardly extending rod 180 connected to a mounting block 182 (FIG. 10). A venturi mounting block 184 is secured to mounting block 182 by screws 186, and block 184 includes a passage 188 therethrough having an inlet end 190 and outlet end 192. A downwardly extending passage 194 communicates with the central portion of passage 188, and a fitting 196 is screwed into the lower end of passage 194, with a sheet-capturing suction cup 198 being secured to the lower end of fitting 196. Nozzle structure 200 is provided in passage 188 adjacent the inlet end of passage 194, so that when air is admitted into the block 184 through the inlet 190, a venturi effect is created to cause a suction in passage 194, in a passage 202 in fitting 196 and in the suction cup 198.

A valve 204 is secured to block 182 by screws 206 on the side of the block opposite from venturi block 184, and valve 204 may be, for example, a conventional three-way valve, such as that available from Mead Fluid Dynamics under catalog FCFC-52. Valve 204 includes an actuator 208 at the upper end thereof that is positioned to be engaged by an abutment surface 210 on the cylinder 176, and valve 204 is connected to the exhaust portion 192 of passage 188 through the tube 212, so that when the piston rod 180 moves downwardly, actuator 208 is operated to allow a suction to be drawn within suction cup 198. When piston rod 180 moves into the fully retracted position illustrated in FIG. 10, the actuator 208 is operated to reverse the flow of air, so that the sheet of paper captured by suction cup 198 will be positively displaced into a position of support upon support 92.

Figure 5:
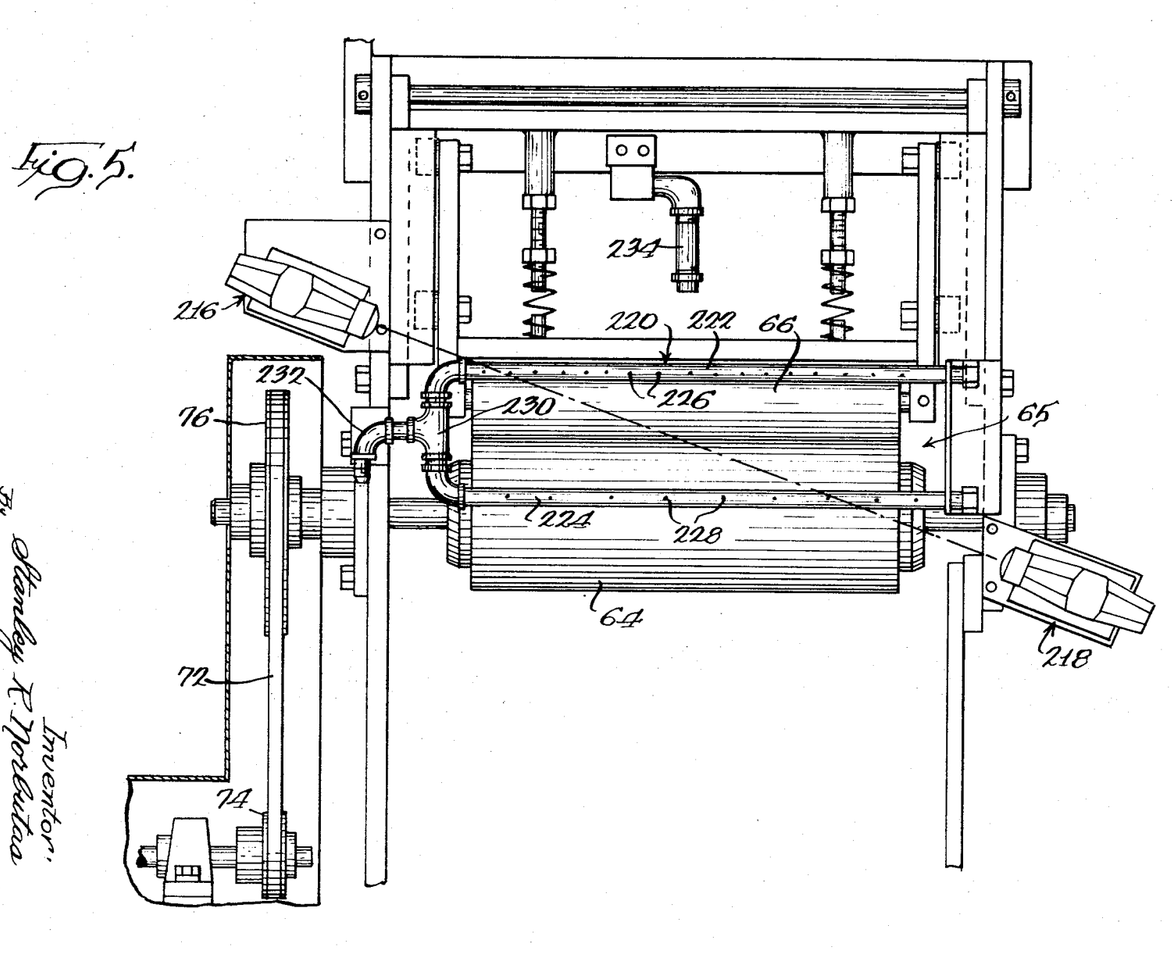
FIG. 5 is an enlarged sectional view taken generally along line 5—5 of FIG. 2.

Assuming that the hopper means 40 is in the separating sheet-feeding position, and that the uppermost sheet has been lifted and deposited upon support 92, the pusher means 130 is then actuated to shift the sheet of paper outwardly of discharge opening 80 into sheet-transferring engagement with rolls 64 and 66. A photoelectric assembly 216, 218 monitors the sheet transfer means 65, and the photoelectric assembly is constructed to give a signal when a supporting sheet is fed by the transfer means 65, but to give no signal when a separating sheet is fed by the transfer means. Sheet-guiding means 220 is also provided adjacent the transfer means 65, and the guiding means will be best understood from FIGS. 5 and 6. The sheet-guiding means 220 includes a pair of spaced parallel pipes or conduits 222 and 224, with conduits 222 and 224 being spaced equally above and below the sheet-feeding plane, respectively. Conduits 222 and 224 include respective transversely spaced, horizontally disposed air-discharging openings 226 and 228. The openings 226 and 228 cooperate to form spaced parallel currents of air which, by fluidic principles, suspend the supporting and separating sheets therebetween as they are fed outwardly by the transfer means 65. Air under pressure is provided to conduits 222 and 224 through a T-connector 230 at one end thereof that communicates with a source of air under pressure through an elbow 232. In order to free the supporting and separating sheets from the influence of the fluidic airstreams, a nozzle 234 is disposed above the plane of sheet movement, and air under pressure is connected to nozzle 234 for providing a pulse of air to deflect the sheets downwardly from the parallel entraining airstreams. A deflector 236 (FIG. 1) is preferably provided at the side of the brick-stacking station remote from feeding means 65 for deflecting the sheets downwardly into engagement with the course of bricks upon elevator 34, and deflector 236 is preferably connected to a pneumatic cylinder in a manner such that the deflector can be withdrawn to a clearance position when the carriage 32 moves forwardly over the elevator.

As is mentioned above, the separating sheets are fed outwardly of compartment means 42 by pusher means 130 after the lifting means 170 have been actuated, and sensing means 90a functions to restore the upper level of sheets in the compartment means 42 to a proper position to be acted upon by the sheet-engaging members 106. To this end, the sensing means, 90a includes a downwardly extending sensitive switch actuator 240, such as a piano wire or the like, having a feeler 242 at the lower end thereof that bears upon the stack of sheets within compartment means 42. Actuator means 240 serves to operate a switch 244 when the stack of sheets within compartment means 42 drops below a preselected level to operate power cylinder 86a to move the sheet-supporting member 78 upwardly within the compartment means 42.

The mechanism for dispensing supporting sheets from the lower portion of compartment means 44 will be best understood by considering FIGS. 3, 4, 6, 9 and 12. As is evident from FIG. 12, the stack-supporting plates 174 are positioned centrally of the compartment means 44, and plates 174 are spaced equally outwardly from the centerline of the compartment means. Plates 174 are spaced relatively closely to one another so as to support the lowermost sheet in the stack in a horizontal position even though it is warped. The lowermost sheet in the stack of supporting sheets rests upon the upper plates surfaces 174a, and the lower surfaces 47a of the guide plates 47 adjacent the forward end of the hopper means 44 are spaced above surfaces 174a by a distance slightly in excess of the thickness of a supporting sheet. Surfaces 47a and 174a cooperate to define a discharge opening 246 from the compartment means 44 with the discharge opening being positioned in alignment with the sheet transfer means 65, when the rollers 55 are in engagement with frame member 24. The guide bars 47 cooperate to define an abutment means for retaining the stack of sheets above the lowermost sheet during shifting of the lowermost sheet relative to the stack.

The supporting sheet-shifting means includes an endless chain 248 trained over a pair of spaced sprockets 250 and 252 that are rotatably mounted between plates 174 be respective shafts 251 and 253. Motor 254 (FIG. 4) is suspended from the frame of the hopper means, and the output shaft thereof is drivingly connected to sprocket 250. A pair of spaced lugs or dogs 256 are connected to chain 248, and are adapted to travel in a rectilinear path adjacent the lower end of compartment means 44. Dogs 256 are positioned to engage one edge of the lowermost supporting sheet and to shift the sheet outwardly of discharge opening 246 into sheet-transferring engagement with transfer means 65. A switch 258 is mounted upon plates 174 at the end thereof removed from discharge opening 246, and the actuator of switch 258 is positioned to be engaged by lug 256 after a sheet has been shifted outwardly of hopper means 44.

OPERATION

Figure 14:
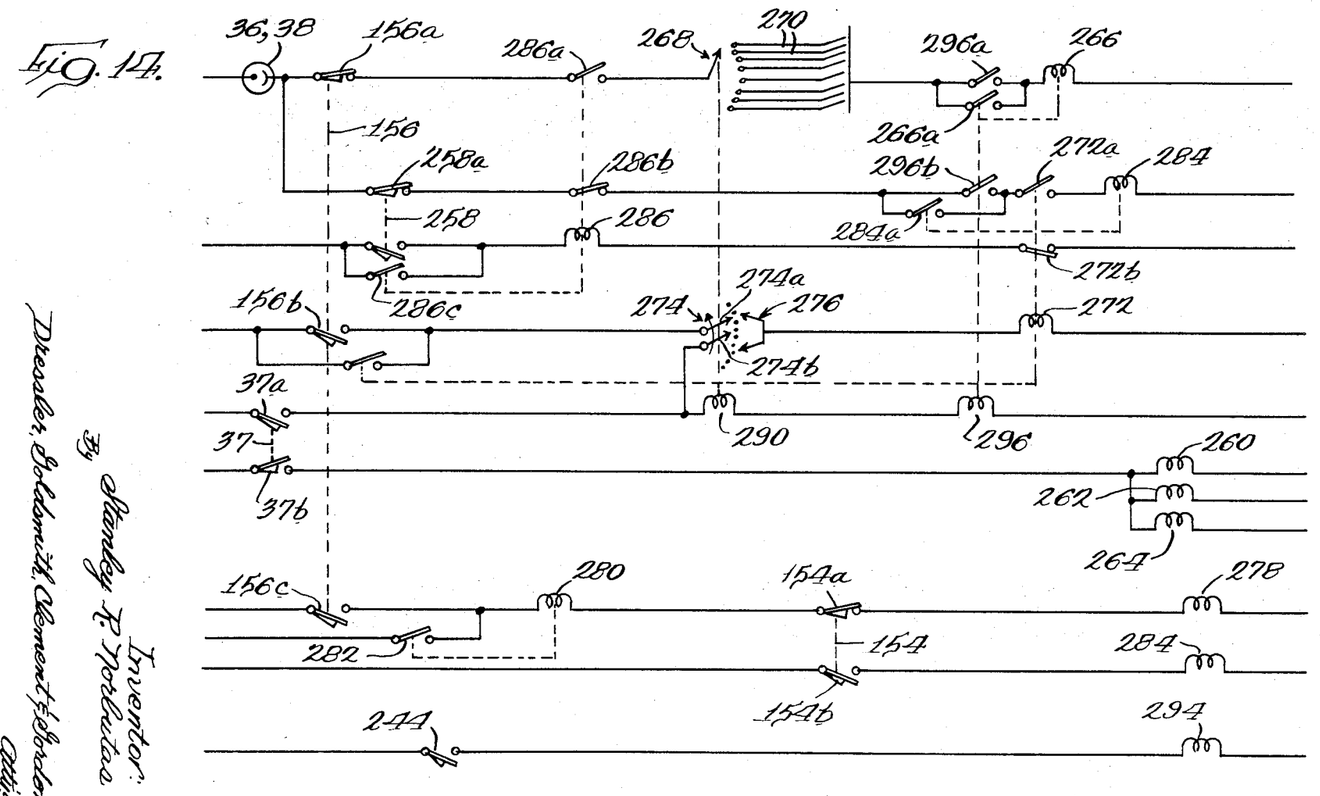
FIG. 14 is a schematic electrical diagram.

The operation of the above-described apparatus will be best understood from a consideration of the electrical diagram schematically illustrated in FIG. 14. After the carriage 32 has deposited the bricks upon elevator 34 at the stacking station 28 and begins to return to the home or rest position, the limit switch 37, which is opened when the carriage has reached its forward position, closes to initiate the sequence-controlling nozzle 234, deflector 236 and fluidic guide means 220 through timer-controlled solenoids 260, 262 and 264, respectively.

When the brick course on elevator 34 drops below the level of photoelectric unit 36, 38, the switch of the photocell is closed. At this point in time, the cylinder 132 is energized through solenoid 266 and stepping switch 268 to move the pusher means 130 forward, if the appropriate manual paper applicator select switch 270 has been previously closed. When the paper pusher forward limit switch 156 is actuated, contact 156a is opened to deenergize the solenoid 266, and contact 156b is closed to energize solenoid 272 through stepping switch 274 and void select switches 276. Energization of solenoid 272 actuates cylinder 56 to cause the hopper means 40 to shift from a paper-feeding position to a veneer-feeding position. Contact 156c is also simultaneously closed to energize solenoid 278 and actuate cylinder 132 to cause the paper pusher 130 to return to its home position. The closing of contact 156c also energizes a relay 280 which closes a bypass switch 282 to keep solenoid 278 energized even though switch 156 opens as the paper pusher 130 initiates its movement to home position. When the paper pusher reaches its home position, switch 154 is actuated to open contact 154a and deenergize the solenoid 278. Simultaneously therewith, contact 154b is closed to initiate the vacuum sequence through solenoid 284, which controls cylinder 176.

The solenoid 272, which controls hopper-shifting cylinder 56, is energized after a void course has been placed on the stack by proper selection of the void select manual switches 276. Solenoid 272 may be energized whether or not a separating sheet has been applied under the void course.

When a separating sheet is applied under the void course, the switch contact 156b is closed and the first contact 274a of stepping switch 274 will close the circuit through an appropriate contact of the void select switch 276 to energize solenoid 272 and close switch 272a. This simultaneously deenergizes the shift hopper to paper solenoid 286 to open contact 286a and close contact 286b. At the same time, shift hopper to veneer solenoid 272 closes contact 272b to keep solenoid 272 energized bypassing the paper pusher forward contact 156b. When the void course is then added to the stack and the elevator drops to a point where photocell 36, 38 closes, the veneer feed solenoid 284 is energized to energize motor 254 and initiate feeding of the veneer. When the sheet of veneer has been fed, lug 256 engages switch 258 to open contact 258a and the circuit to the veneer pusher solenoid 284, and to close switch contact 258b to energize the shift hopper to paper solenoid 286. This closes contact 286a, opens contact 286b and closes contact 286c to bypass switch 258. With the positioning of each course of bricks on the elevator, contact 37a closes to energize solenoid 290 thereby advancing the stepping switches 268 and 274. This deenergizes solenoid 272 opening contact 272a and closing contact 272b allowing the shift hopper to paper solenoid 286 to be energized by the closing of veneer switch 258.

If, on the other hand, paper is not applied before the void course, then the stepping of switch 274, by the energization of solenoid 290, advances the second contact 274b of the stepping switch into engagement with the closed contact of the void select switch 276, whereby the shift to veneer solenoid 272 is energized and the contact 156b of the paper pusher forward limit switch 156 is bypassed.

Whenever the supply of paper reaches a low level, switch 244 is closed energizing the raise paper solenoid until the paper is raised to appropriate level when switch 244 is opened.

In order to control selective energizing of the paper pusher solenoid 266 and the veneer shift solenoid 284, a holding relay 296 is energized thereby closing contacts 296a and 296b until after the stack level photocell 36, 38 energizes the appropriate circuit to energize solenoid 266 or 284. Energization of solenoids 266 or 284 will also energize respective bypass switches 266a and 284a, so that the appropriate solenoid continues to operate after relay 296 deenergizes. In this way, when the shift hopper relays 272 or 286 are energized, the paper pusher solenoids will not energize because relay 296 is deenergized. At this point in time, the stack level photocell 36, 38 is blocked by the new course of bricks, thereby preventing immediate energizing of the feeding solenoids until the operation is initiated as described above.

What I claim is:

1. For use in combination with an apparatus for stacking a plurality of courses of objects upon one another to form a bundle of objects, a feeder for inserting a supporting sheet above a course of objects having lift fork-receiving openings therein and for inserting a separating sheet between one or more of the other courses of objects, said feeder comprising: a frame having means defining an object-stacking station; hopper means adjacent said object-stacking station and having vertically spaced supplies of separating sheets and supporting sheets therein; sheet-feeding means for transferring said separating sheets and supporting sheets from said hopper means to said object-stacking station; and means mounting said hopper means for vertical movement relative to said frame to position said hopper in either supporting sheet-transferring relationship with respect to said sheet-feeding means or separating sheet-transferring relationship with respect to said sheet feeding means.

2. A feeder as set forth in claim 1 in which said mounting means includes means guiding said hopper for vertical movement relative to said frame, and wherein said sheet-feeding means includes sheet transfer means positioned between the path of movement of said hopper means and said object stacking station for transferring sheets laterally from said hopper means to said stacking station.

3. A feeder as set forth in claim 2 wherein said hopper means includes a first compartment for storing said separating sheets and a second compartment for storing said supporting sheets.

4. A feeder as set forth in claim 3 in which said second compartment is arranged vertically above said first compartment; and wherein said feeding means further includes means for shifting a supporting sheet from the bottom of said second compartment into engagement with said transfer means, and means for shifting a separating sheet from the top of said first compartment into engagement with said transfer means.

5. A feeder as set forth in claim 4 including means for moving the supply of separating sheets upwardly in said first compartment.

6. The invention set forth in claim 4 in which said second compartment has a sheet discharge opening therein, and wherein pusher means is positioned adjacent one end of said second compartment, said pusher means having an abutment positioned to engage the edge of the lowermost sheet of said supporting sheets remote from the discharge opening; and wherein drive means is connected to said pusher means for shifting said abutment toward said discharge opening to shift said lowermost sheet into engagement with said transfer means.

7. The invention set forth in claim 6 in which said discharge opening is positioned at the lower end of said second compartment; and wherein said pusher means is positioned at the lower end of second compartment, with said abutment arranged to engage the lowermost of said supporting sheets.

8. The invention set forth in claim 7 wherein said second compartment includes stripping means above said discharge opening, said stripping means being positioned to engage the supporting sheets above said discharge opening during movement of said lowermost sheet.

9. The invention set forth in claim 7 wherein said second compartment includes stack-supporting means for holding a stack of said supporting sheets and positioning said lowermost sheet in alignment with said discharge opening, said supporting means including a pair of parallel rails spaced generally equally outwardly from the centerline of said stack.

10. The invention set forth in claim 7 wherein said drive means includes an endless chain arranged with a reach portion parallel with the bottom of said stack, said abutment being carried by said chain.

11. Apparatus for shifting a separating sheet from a supply of sheets into engagement with a sheet transfer means comprising: compartment means for storing a stack of sheets with the uppermost sheet in alignment with a discharge opening in the compartment means, said compartment means including stop means adjacent said discharge opening and a support above said stop means; a sheet pusher assembly mounted for reciprocating movement relative to said compartment means toward and away from said discharge opening, said pusher assembly including sheet-engaging means for shifting the uppermost sheet into engagement with said transfer means when said pusher assembly moves toward said discharge opening; means for moving said pusher assembly from a retracted position spaced from said discharge opening to an extended position adjacent said discharge opening; means for moving said pusher assembly a predetermined distance away from said retracted position and toward said discharge opening so that said sheet-engaging means push said uppermost sheet into engagement with said stop means to create an upwardly extending bulge therein; and lifting means for engaging the bulged portion of said sheet and for lifting the sheet to place it on the support prior to the movement of said pusher assembly from said retracted position to said extended position.

12. Apparatus as set forth in claim 11 in which said pusher assembly includes support means; and wherein said sheet-engaging means includes rollers rotatably mounted on said support means and spaced equally outwardly from the centerline of said compartment means, and clutch means connected between said support means and said rollers for allowing said rollers to rotate when said pusher assembly moves away from said discharge opening and for preventing said rollers from rotating when said pusher assembly moves toward said discharge opening.

13. Apparatus as set forth in claim 12 wherein said means for moving said pusher assembly from a retracted position spaced from said discharge opening to an extended position adjacent said discharge opening includes cylinder means connected to said pusher assembly.

14. Apparatus as set forth in claim 13 wherein said means for moving said pusher assembly a predetermined distance away from said retracted position and toward said discharge opening includes spring means adjacent said retracted position.

15. Apparatus for shifting a separating sheet from a supply of sheets into engagement with a sheet transfer means comprising: compartment means for storing a stack of sheets with the uppermost sheet in alignment with a discharge opening in the compartment means, said compartment means including stop means and a support adjacent said discharge opening; a sheet pusher assembly mounted for reciprocating movement relative to said compartment means toward and away from said discharge opening, said pusher assembly including support means, sheet-engaging means including rollers rotatably mounted on said support means and spaced equally outwardly of the centerline of the compartment means, and clutch means connected between said support means and said rollers for allowing said rollers to rotate freely when said pusher assembly moves away from said discharge opening and for preventing rotation of said rollers when said pusher assembly moves toward said discharge opening to frictionally engage said uppermost sheet and feed it outwardly of said discharge opening; cylinder means connected to said pusher assembly for moving said pusher assembly from a retracted position spaced from said discharge opening to an extended position adjacent said discharge opening; spring means adjacent said retracted position for moving said pusher assembly toward said discharge opening so that said sheet engaging rollers push said uppermost sheet into engagement with said stop means to create a bulge therein; and lifting means for engaging the bulged portion of said sheet and for lifting the sheet to place it on the support prior to movement of said pusher assembly from said retracted position to said extended position.

16. Apparatus as set forth in claim 14 in which said lifting means includes a suction-applying means, and means for moving said suction-applying means into engagement with said bulged portion for capturing said uppermost sheet and for moving said suction-applying means away from said stack to lift said sheet above said support.

17. Apparatus as set forth in claim 11 including means adjacent said discharge opening for providing spaced parallel currents of air for guiding said sheet from said discharge opening to said transfer means.

18. Apparatus as set forth in claim 11 including means for shifting said stack upwardly in said compartment means.

19. Apparatus for shifting a supporting sheet from a supply of sheets into engagement with a sheet transfer means comprising: compartment means for storing a stack of sheets, said compartment means having a sheet discharge opening therein; means at the lower end of said compartment means for supporting said stack and positioning the lowermost sheet in the stack in alignment with the discharge opening, said supporting means being defined by a pair of closely spaced parallel rails having their upper surfaces disposed in a common plane, said upper surfaces providing the sole support for said stack, means mounting said compartment means with said discharge opening adjacent said transfer means; pusher means positioned adjacent one end of said compartment means, said pusher means having an abutment extending upwardly between said rails and positioned to engage the edge of the lowermost sheet of said stack of sheets remote from the discharge opening; and drive means connected to said pusher means for shifting said abutment toward said discharge opening to shift said lowermost sheet into engagement with said transfer means.

20. Apparatus as set forth in claim 15 in which said lifting means includes a suction-applying means, and means for moving said suction-applying means into engagement with said bulged portion for capturing said uppermost sheet and for moving said suction-applying means away from said stack to lift said sheet above said support.

21. Apparatus as set forth in claim 4 wherein said means for shifting a separating sheet includes means in said first compartment for storing a stack of sheets with the uppermost sheet in alignment with a discharge opening in the first compartment; and a sheet pusher assembly mounted for reciprocating movement relative to said first compartment toward and away from said discharge opening, said pusher assembly including sheet-engaging means constructed to rotate freely when said pusher assembly moves away from said discharge opening and held against rotation when said pusher assembly moves toward said discharge opening to frictionally engage said uppermost sheet and feed it outwardly of said discharge opening.

22. Apparatus as set forth in claim 21 in which said pusher assembly includes support means; and wherein said sheet-engaging means includes rollers rotatably mounted on said support means and spaced equally outwardly from the centerline of said compartment means, and clutch means connected between said support means and said rollers for allowing said rollers to rotate when said pusher assembly moves away from said discharge opening and for preventing said rollers from rotating when said pusher assembly moves toward said discharge opening.

23. Apparatus as set forth in claim 22 including cylinder means connected to said pusher assembly for moving said pusher assembly from a retracted position spaced from said discharge opening to an extended position adjacent said discharge opening.

24. Apparatus as set forth in claim 23 in which said first compartment includes stop means adjacent said discharge opening, and wherein spring means is provided adjacent said retracted position for moving said pusher assembly toward said discharge opening so that said sheet-engaging rollers push said uppermost sheet into engagement with said stop means to create a bulge therein.

25. Apparatus as set forth in claim 24 in which said first compartment includes a support adjacent said discharge opening, and wherein lifting means is provided for engaging the bulged portion of said sheet and for lifting the sheet to place it on the support prior to the movement of said pusher assembly from said retracted position to said extended position.

26. Apparatus as set forth in claim 25 in which said lifting means includes a suction-applying means, and means for moving said suction-applying means into engagement with said bulged portion for capturing said uppermost sheet and for moving said suction-applying means away from said stack to lift said sheet above said support.

27. Apparatus as set forth in claim 21 including means adjacent said discharge opening for providing spaced parallel currents of air for guiding said sheet from said discharge opening to said transfer means.